Aug. 10, 1965 S. G. ENDERS 3,199,251
DRIVING MECHANISM FOR ABRADING TOOL
Filed Dec. 20, 1963 2 Sheets-Sheet 2
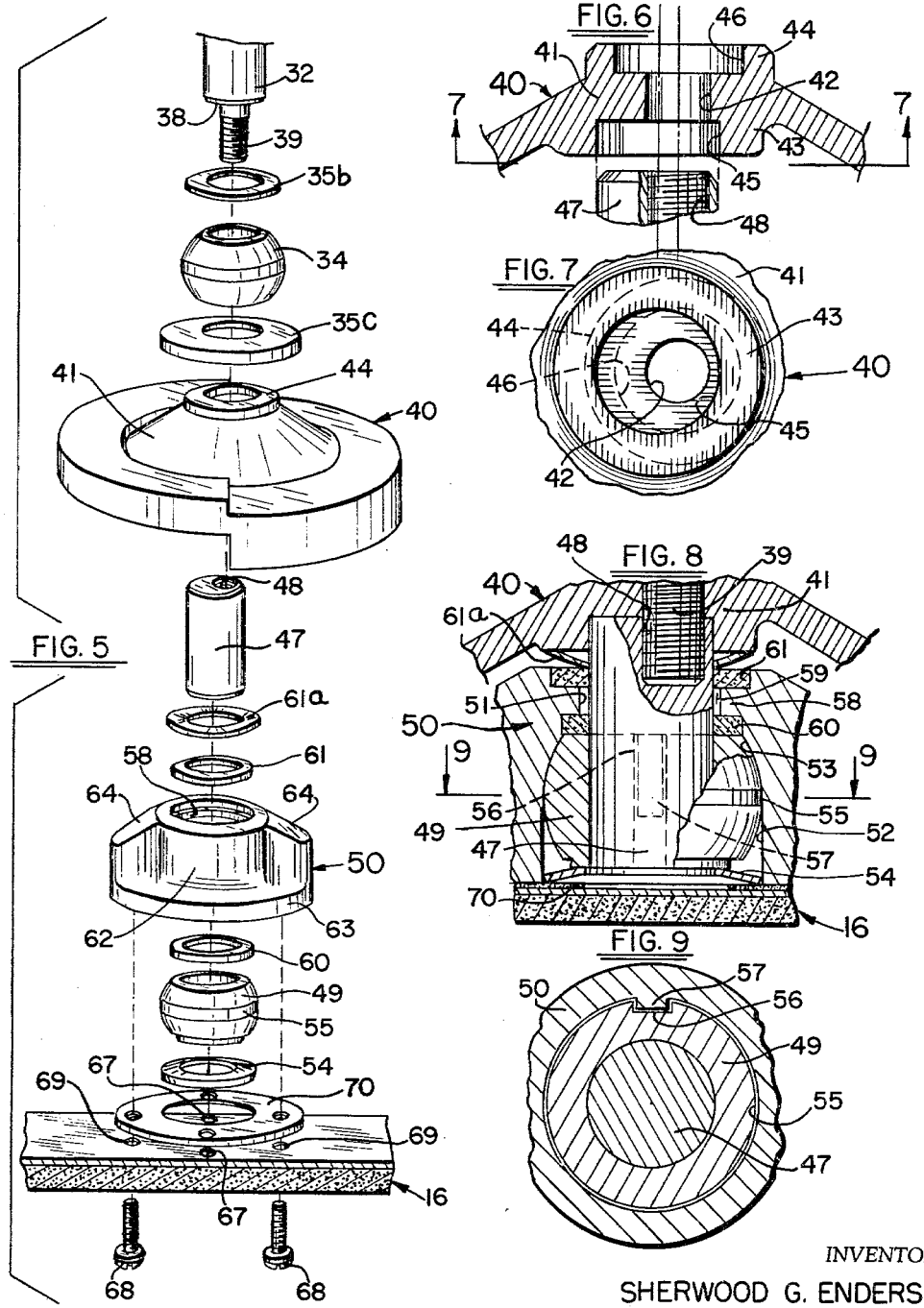
INVENTOR
SHERWOOD G. ENDERS
BY Leonard Bloom
ATTORNEY United States Patent Office 3,199,251
Patented Aug. 10, 1965

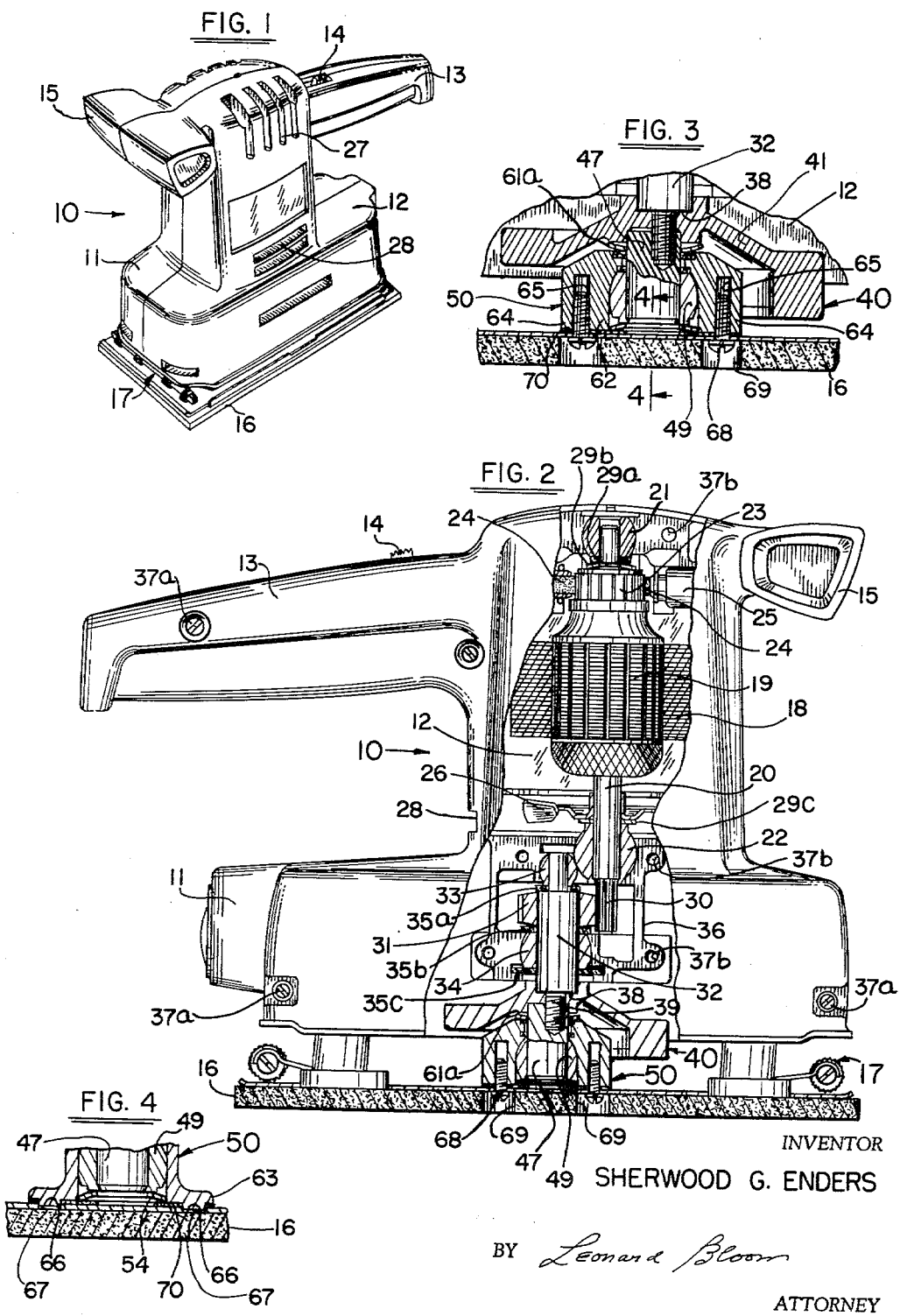

3,199,251
DRIVING MECHANISM FOR ABRADING TOOL
Sherwood G. Enders, Bowley's Quarters, Md., assignor to The Black and Decker Manufacturing Company, Towson, Md., a corporation of Maryland
Filed Dec. 20, 1963, Ser. No. 332,148
14 Claims. (Cl. 51—170)

The present invention relates to a driving mechanism for an abrading tool, such as a portable electric finishing sander having an oscillating platen, and more particularly, to a low-cost driving mechanism whose components may be fabricated easily and economically and assembled quickly and conveniently.

In the prior art of which I am aware, power-operated abrading tools are well-known and generally comprise a housing, an oscillating platen resiliently mounted to the housing, a vertically-disposed motor in the housing, and a driving mechanism comprising a spindle driven by the motor, an eccentric member driven by the spindle, and a bearing on the platen to journal the eccentric. The mechanisms which are habitually resorted to in the prior art, however, involve structures and combinations of elements which are cumbersome and complicated, hence costly to manufacture and to assemble, and which are somewhat awkward to disassemble for inspection and service.

Accordingly, it is an object of the present invention to alleviate the deficiencies of the prior art structures by providing, for use in conjunction with an abrading tool, a low-cost driving mechanism which has the following advantages and characteristics: (1) uses simple and inexpensive components that may be easily cast or else readily produced on automatic screw machines or their equivalent; (2) avoids machining or finishing of cast parts; (3) may be readily assembled with a minimum of time; (4) uses a self-aligning spherical sleeve bearing retained on the platen and self-tapping screws to secure the retainer to the platen; (5) is rugged and reliable for relatively-high performance over extended periods of time; and (6) may be readily disassembled for quick inspection and service, if required.

It is another object of the present invention to provide for use in conjunction with an abrading tool, a mechanism comprising a counterbalance having a hub formed with a bore and a pair of counterbores, one of which is formed eccentrically with the bore, and the other of which is substantially alined with the bore, a driving member and a driven member, one of which is received in the eccentric counterbore, and the other of which is received in the alined counterbore, the one member, which is received in the eccentric counterbore, having a recess formed therein eccentrically to its axis, the recess being substantially alined with the bore in the counterbalance hub, and the other member having an integral extension of reduced diameter received in the recess of the one member and secured therein, thereby securing the members together, and thereby properly orienting and locating the counterbalance and retaining it between the members.

It is yet another object of the present invention to provide a bearing retainer mounted on top of the oscillating platen in combination with a double sealing means (separated by an air chamber therebetween) to seal off the bearing retainer from the dust-laden atmosphere surrounding the platen, thereby effectively preventing the lubricant in the retanier from being "wick fed" out of the retainer.

In accordance with the broad teachings of the present invention, there is herein illustrated and described, a driving mechanism suitable for an abrading tool and comprising a drive spindle journaled in the housing, an eccentric drive pin secured to the spindle, a counterbalance having a hub retained between the spindle and pin, means to properly orient and locate the counterbalance hub with respect to the pin and spindle, a bearing retainer and means to locate the retainer and secure it to the platen, a spherical seat formed in the retainer, and a spherical sleeve bearing in the seat to journal the drive pin.

In accordance with the specific teachings of the present invention, there is herein illustrated and described, for use in conjunction with an abrading tool having a housing and an oscillating platen resiliently mounted to the housing, a preferred embodiment of a low-cost driving mechanism comprising a drive spindle journaled in the housing, a drive pin having an axis eccentric to the axis of the spindle and secured thereto, a counterbalance retained between the pin and a shoulder formed on the spindle, a bearing retainer secured on top of the platen, the retainer having an axial bore formed with a counterbore, the inner portion of which has a spherical seat facing the platen, a spherical sleeve bearing in the counterbore to journal the drive pin, resilient means between the platen and the bottom of the bearing to constantly urge the bearing against its seat, keying means between the bearing and the retainer to prevent the bearing from turning about its axis, and means to seal off the retainer from the dust-laden atmosphere surrounding the platen. Preferably, this last-named sealing means comprises an inwardly-projecting annular rib formed in the bearing retainer above its seat, the rib and the drive pin having an annular recess therebetween, and a pair of sealing washers disposed between the retainer and the pin, one on each axial side of the annular rib.

These and other objects of the present invention will become apparent from a reading of the following specification, taken in conjunction with the enclosed drawings, in which:

FIGURE 1 is a front perspective view of the overall abrading tool whose driving mechanism is constructed in accordance with the teachings of the present invention;

FIGURE 2 is an enlarged longitudinal section with parts broken away and sectioned to illustrate, not only the mechanism of the present invention, but also the motor, the conventional halves of the split housing, the driving spindle, and usual bearings for the motor shaft and drive spindle;

FIGURE 3 is an enlarged fragmentary view of FIGURE 2, showing the structural details of the low-cost driving mechanism of the present invention;

FIGURE 4 is a partial sectional view taken along the lines 4—4 of FIGURE 3, showing the manner in which the bearing retainer is located with respect to the oscillating platen;

FIGURE 5 is an exploded perspective view of the structural components which comprise the driving mechanism of the present invention;

FIGURE 6 is an enlarged fragmentary sectional view of the counterbalance hub, showing a portion of the drive pin in exploded relationship;

FIGURE 7 is a bottom plan view of the counterbalance hub, the view being taken along the lines 7—7 of FIGURE 6;

FIGURE 8 is an enlarged fragmentary sectional view of the driving mechanism shown in FIGURE 3, the view showing the sealing means in greater detail; and FIGURE 9 is a section taken along the lines 9—9 of FIGURE 8, showing the manner of keying the bearing to its retainer.

With reference to FIGURE 1, there is illustrated a portable electric orbital sander 10 with which the teachings of the invention may find particular utility; however, it will be appreciated by those skilled in the art that the present invention is equally applicable to various other types of power-operated abrading tools and rubbing devices, such as a grinder, scraper, or polisher. With this in mind, the orbital sander 10 comprises a housing having a pair of mating halves 11 and 12 detachably secured together along a common longitudinal midplane, a handle 13 with a switch 14, an auxiliary handle support or rest 15, a conventional oscillating platen 16 resiliently mounted to the housing in a suitable manner, and an abrasive paper clamp, the latter being denoted generally as at 17.

With reference to FIGURE 2, the orbital sander is powered by a conventional electric motor comprising a field 18 and an armature 19, the latter having a shaft 20 journaled in spaced bearings 21 and 22 in the housing. The armature is formed with a commutator 23 which engages a pair of brushes 24 mounted in suitable holders 25. The armature shaft carries a fan 26 which draws cooling air into inlet slots 27 formed in the housing and discharges the air radially through outlet slots 28, the slots being shown more clearly in FIGURE 1; preferably, a fiber washer 29a and spring washer 29b are disposed between the bearing 21 and the commutator 23, while a fiber washer 29c is disposed between the hub of the fan 26 and the bearing 22. A pinion 30 is formed on the end of the armature shaft. The pinion engages a gear 31 carried by a drive spindle 32 which is journaled in spaced bearings 33 and 34 in the housing. Preferably, a fiber washer 35a is between the bearing 33 and the gear 31, a fiber washer 35b is between the gear and the bearing 34, and a felt washer 35c (in the nature of a seal) is between the bearing 34 and the bottom wall portions of a gear case 36. The gear case 36 is substantially box-shaped and encloses the gear and pinion, the motor shaft and its forward bearing, the drive spindle, and the two bearings for the spindle. Each of the mating halves of the split housing is formed with complementary internal wall portions which mate with one another in a conventional manner to form the enclosed gear case 36, it being noted that the top mating half 11 is secured to the bottom mating half 12 by means of the usual self-tapping screws 37a which enter cast recesses 37b formed in the bottom half.

The structure thus far described is considered well-known in the art, and no claim is being made to it; it has been described herein purely for orientation purposes, so that the mechanism of the present invention and its intended application in the overall tool will be more clearly appreciated by those skilled in the art. More specifically, the use of mating housing portions, commonly referred to as a "clam-shell" housing; self-tapping screws and cast-in recesses in the bottom half to hold the mating halves together; complementary internal wall portions or partitions to form an enclosed gear case; sleeve bearings of the spherical type (as shown in the drawings) to journal the motor shaft and the drive spindle; and trapping the bearings as well as the brush holders and the motor field between the mating halves as the halves are secured together—all constitute a well-known design technique and procedure, one which is quite old in the art, having been used, for example, in portable electric drills, jig saws, hedge trimmers, and various other appliances and related devices. The contribution of the present invention, however, resides in the novel structure and assembly of the low-cost driving mechanism; and this driving mechanism, which will now be described in detail, may be used either with or without the conventional general structure previously noted.

With reference again to FIGURE 2, and with further reference to the remaining drawings, the drive spindle 32 has a shoulder 38 and an integral concentric extension 39 (of reduced diameter) which is provided with suitable threads. A counterbalance 40 is provided; and the counterbalance has a hub 41, see FIGURE 6, which is formed with a bore 42 therethrough and a pair of bosses 43 and 44 having respective counterbores 45 and 46, each of which communicates with the bore. Preferably, each of the counterbores is formed substantially concentric to, that is, symmetrical with its respective boss. Counterbore 45 has its axis eccentric with respect to the axis of the bore 42, while counterbore 46 has its axis substantially alined with the bore. A drive pin 47 comprising a substantially-smooth cylindrical member is received in the eccentric counterbore 45; and the pin 47 has a tapped hole 48, which is formed eccentrically to the axis of the pin, and which is substantially alined with the axis of the bore 42. Once the drive pin 47 has been received in the counterbore 45 and thus positioned, the drive spindle 32 is received in the alined counterbore 46 such that its threaded extension 39 passes through the bore 42 and is threadably received in the tapped recess of the pin. Consequently, the drive pin and spindle are secured together, while the counterbalance is properly oriented and located and suitably retained between the pin 47 and the shoulder 38 formed on the spindle. The components comprising the drive spindle 32, counterbalance 40, and drive pin 47 are thus fabricated so that they may be assembled together in only one position.

Since, the design and configuration of the drive spindle 32 and the drive pin 47 are quite simple, these components may be quickly and easily manufactured on high-speed production machinery, such as an automatic screw machine; while the counterbalance 40 is a simple cast piece which requires no machining or finishing, yet is balanced dynamically as well as statically. The drive spindle, counterbalance, and drive pin may be quickly assembled together for usage in the completed sander, or quickly disassembled for convenient inspection and service. The preferred embodiment of the drive spindle, counterbalance, and drive pin (herein illustrated and described) is indicative of the teachings of the present invention; however, it will be apparent to one skilled in the art that a simple reversal may be made. For example, the eccentric counterbore 45 may be formed in the top of the counterbalance hub, and the alined counterbore 46 in the bottom, in which case the spindle 32 would have the eccentrically-formed tapped recess, while the drive pin 47 would have the concentric extension. Moreover, it will be appreciated that a threaded engagement between the driving member (the spindle) and the driven member (the pin) is not necessary; other means for securing these members together, such as press-fitting or brazing, are equally applicable. The teachings of the present invention, therefore, contemplate a simple cast counterbalance whose hub is formed with a bore and a pair of counterbores, one alined and the other eccentric, a driving member and a driven member, one received in the alined counterbore and the other in the eccentric counterbore, and the member which is received in the eccentric counterbore being provided with an eccentric recess which is substantially alined with the bore and with the other counterbore, and which receives the extension formed integrally with the other member, thereby securing the members together, and thereby properly orienting and locating the counterbalance hub and retaining it between the members.

With reference again to the remaining drawings, particularly FIGURES 4, 5, 8, and 9, the drive pin 47 is journaled in a spherical sleeve bearing 49 which preferably comprises a porous bronze composition material formed economically by a sintering process in which the bearing is impregnated with a suitable lubricant. The bearing 49 is retained in a bearing retainer 50 which is a simple cast piece formed with a bore 51 and a counterbore 52. The counterbore 52 is provided with a spherical seat 53 facing the oscillating platen; and resilient means, such as a bowed spring washer 54, is disposed between the platen and the end of the bearing (and concavely with respect to the platen) to maintain the bearing against its spherical seat. The bearing is provided with an external annular flat 55 for ease and convenience in its manufacture; and a keying means comprising an external longitudinal slot 56 formed in the bearing and a longitudinal key 57 formed in the retainer, see FIGURE 9, prevents the bearing from turning about its axis. The use of a spherical sleeve bearing retained on the oscillating platen to journal the drive pin provides a simple and economical, yet effective self-aligning means which accommodates production mis-alignments or tolerance accumulations between the drive pin and the oscillating platen. The use of a spherical sleeve bearing retained on the platen, especially in conjunction with the other structure of the present application, is new in the published or commercially-developed art to which the invention pertains. The prior art has habitually resorted to accurate closely-machined surfaces, or else to ball bearings with special self-aligning features, or else to needle bearings mounted in special annular resilient members in order to derive a degree of self-alinement—all of which is costly to manufacture, cumbersome, and awkward to service.

As shown more clearly in FIGURE 8, the bearing retainer is further provided with an internal annular rib 58 above the spherical seat, and the rib 58 and the drive pin 47 have an annular recess 59 therebetween. A pair of sealing washers, such as felt washers 60 and 61, are disposed between the bearing retainer and the drive pin, one on each axial side of the annular rib; and a spring washer 61a is lodged between the top washer 61 and the hub of the counterbalance. Thus a double sealing means, comprising the spaced washers 60 and 61, is provided to seal off the retainer from the dust-laden atmosphere surrounding the platen; and the air space between the washers, comprising the annular recess 59, prevents the lubricant from being "wick fed" out of the retainer.

With further reference to FIGURES 3, 4, and 5, the bearing retainer 50 comprises a body portion 62 and an integral flange portion 63 which is located and secured on top of the oscillating platen. A pair of external bosses 64 are formed integrally with the body portion, diametrically opposite to one another. An axial bore 65 is formed in each of the bosses, and each of the bores opens to the bottom of the flange portion of the retainer. A pair of locating pins 66 project slightly below the bottom of the flange, see FIGURE 4, and the locating pins 66 are diametrically opposite to one another and are disposed on an axis which is substantially at right angles to the axis of the bosses. A pair of diametrically-opposite pockets 67, see FIGURE 5, are formed in the top of the platen to receive the locating pins, thereby positioning the retainer on the platen; and suitable fastening means comprising self-tapping screws 68 are received through apertures 69 in the platen, through suitable apertures in a felt washer 70, through the flange portion of the retainer, and into the bores of the respective bosses formed on the bearing retainer, thereby securing the retainer to the platen.

The bearing retainer 50, like the counterbalance 40, is a simple cast aluminum piece which requires no machining or finishing; and the use of the self-tapping screws 68, like the screws 37a to hold the mating halves of the housing together, obviates the necessity for tapping the bores 65 and further reduces the manufacturing cost.

The oscillating platen 16, which is illustrated herein, is designed to exhibit what is referred to in the art as orbital motion; however, if desired, suitable means could be employed to constrain the platen to exhibit straight reciprocating motion, and also, various other means could be employed, likewise well-known in the art, to shift the motion from reciprocating to orbital and vice-versa. The driving mechanism of the present invention, however, would be equally applicable to such other motion imparted to the oscillating platen.

Obviously, many modifications may be made without departing from the basic spirit of the present invention; and accordingly, within the scope of the appended claims, the invention may be practiced other than has been specifically described herein.

I claim:

1. In an abrading tool having a housing, an oscillating platen, and means to resiliently mount the platen to the housing, a driving mechanism for the platen, comprising, in combination:
   (a) a drive spindle journalled in the housing;
   (b) a cylindrical drive pin having its axis eccentric to the axis of said spindle;
   (c) a counterbalance between said pin and said spindle;
   (d) means to secure said pin to said spindle; said means including means to retain said counterbalance between said pin and said spindle and to position said counterbalance circumferentially with respect to the axis of said drive pin;
   (e) a bearing retainer on top of the platen and means to secure said retainer against rotation;
   (f) said retainer having a spherical seat formed therein; and
   (g) a spherical sleeve bearing in said seat to journal said drive pin;
   (h) whereby said spherical bearing, said bearing retainer, and the platen are free to move vertically with respect to the cylindrical drive pin, being retained only by the means to resiliently mount the platen to the housing.

2. The combination of claim 1, wherein spring means are provided between the platen and the bottom of said bearing; said spring means comprising:
   (a) a resilient bowed washer retained between the platen and the end of said drive pin, said washer being disposed concavely with respect to the platen, whereby said spherical bearing is constantly urged towards its seat.

3. In a mechanism for an abrading tool, the combination of:
   (a) a counterbalance formed with a hub having a bore therethrough;
   (b) a pair of bosses formed on said hub, each of which has a counterbore communicating with said bore;
   (c) one of said counterbores having its axis eccentric with respect to the axis of said bore, and the other of said counterbores having its axis substantially alined with said bore; and
   (d) a pair of substantially-cylindrical members comprising a driving member and a driven member, one of which is received in said eccentric counterbore, and the other of which is received in said alined counterbore;
   (e) said one member having a recess formed therein eccentrically to its axis, said recess being substantially alined with said bore in said hub of said counterbalance; and
   (f) said other member having an integral extension of reduced diameter passing through said bore in said hub and being received in said recess of said one member and secured therein, thereby securing said members together, and thereby properly orienting and locating said counterbalance and retaining it between said members.

4. In a mechanism for an abrading tool, the combination of:
   (a) a counterbalance having a bore therethrough and a pair of counterbores, one on each end of said bore and communicating therewith;
   (b) one of said counterbores being substantially alined with said bore, and the other of said counterbores being formed eccentrically of said bore;
   (c) a drive pin received in said eccentric counterbore;
   (d) said pin having a tapped recess formed therein eccentrically of its axis, said recess being substantially alined with said bore in said counterbalance; and
   (e) a drive spindle received in said concentric counterbore;
   (f) said spindle having an integral externally-threaded extension of reduced diameter passing through said bore in said counterbalance and being received in said tapped recess in said drive pin, thereby securing said pin and spindle together, and thereby properly orienting and locating said counterbalance and retaining it therebetween.

5. In an abrading tool having an oscillating platen, the combination of:
(a) a bearing retainer comprising a body portion formed with an axial bore, an integral flange portion, and means to locate and secure said flange portion of said retainer to said platen;
(b) said bore of said retainer being formed with a counterbore, the inner portion of which has a spherical seat facing said platen;
(c) a spherical sleeve bearing in said counterbore and means to urge said bearing against said seat;
(d) a drive pin passing through said bore in said retainer and journaled in said bearing;
(e) an internal annular rib formed in said bore of said retainer transversely of the axis of said bore, said rib and said drive pin having an annular recess therebetween; and
(f) a pair of sealing washers disposed between said retainer and said pin, one on each axial side of said annular rib.

6. The combination of claim 5, wherein said means to locate and secure said flange portion of said retainer to said platen, comprises:
(a) a pair of external bosses formed integrally with said body portion of said retainer, diametrically opposite to one another;
(b) an axial bore formed in each of said bosses, each of said bores opening to the bottom of said flange portion of said retainer;
(c) a pair of locating pins projecting below the bottom of said flange portion of said retainer, said pins being diametrically opposite to one another and being disposed on an axis which is substantially at right angles to the axis of said bosses;
(d) a pair of diametrically-opposite pockets formed in said platen to receive said locating pins; and
(e) fastening means passing through said platen and received in said bores of said respective bosses.

7. In an abrading tool having a housing and an oscillating platen resiliently mounted to the housing, a driving mechanism for the platen, comprising, in combination:
(a) a counterbalance formed with a hub having a bore therethrough and a pair of counterbores, one on each end of said bore and communicating therewith;
(b) one of said counterbores being substantially alined with said bore, and the other of said counterbores being formed eccentrically of said bore;
(c) a drive spindle journaled in said housing and having a portion received in said alined counterbore;
(d) said spindle further having an integral extension of reduced diameter passing through said bore and said counterbore of said counterbalance hub;
(e) a bearing retainer secured on top of said platen;
(f) said retainer having a spherical seat formed therein;
(g) a spherical sleeve bearing in said seat;
(h) a drive pin journaled in said bearing;
(i) said pin having a portion received in said eccentric counterbore and further having a recess formed therein eccentrically to its axis;
(j) said recess being substantially alined with said bore in said counterbalance hub; and
(k) said extension of said spindle being received in said recess and secured therein, thereby securing said drive pin and spindle together, and thereby properly orienting and locating said counterbalance and retaining it between said pin and spindle.

8. In an abrading tool having a housing and an oscillating platen resiliently mounted to the housing, a driving mechanism for the platen, comprising, in combination:
(a) a counterbalance formed with a hub having a bor therethrough and a pair of counterbores, one on each end of said bore and communicating therewith;
(b) one of said counterbores being substantially alined with said bore, and the other of said counterbores being formed eccentrically of said bore;
(c) a drive spindle journaled in said housing and having a portion received in said alined counterbore;
(d) said spindle further having an integral extension of reduced diameter passing through said bore and said eccentric counterbore of said counterbalance hub;
(e) a bearing retainer secured on top of said platen;
(f) a bearing in said retainer and a drive pin passing through said retainer and being journaled in said bearing;
(g) said pin having a portion received in said eccentric counterbore and further having a recess formed therein eccentrically to its axis;
(h) said recess being substantially alined with said bore in said counterbalance hub;
(i) said extension of said spindle being received in said recess and secured therein, thereby securing said drive pin and spindle together, and thereby properly orienting and locating said counterbalance and retaining it between said pin and spindle;
(j) an internal annular rib formed in said retainer above said bearing, said rib and said drive pin having an annular recess therebetween; and
(k) a pair of sealing washers disposed between said retainer and said pin, one on each axial side of said annular rib.

9. In an abrading tool having a housing and an oscillating platen resiliently mounted to the housing, a driving mechanism for the platen, comprising, in combination:
(a) a bearing retainer secured on top of the platen;
(b) said retainer having an axial bore formed with a counterbore, the inner portion of which has a spherical seat facing the platen;
(c) a spherical sleeve bearing in said counterbore;
(d) resilient means between the platen and the bottom of said bearing to constantly urge said bearing against said seat;
(e) keying means between said bearing and said retainer to prevent said bearing from turning about its axis;
(f) a drive pin journaled in said bearing and extending through said bore in said retainer;
(g) an internal annular rib formed in said retainer above said bearing, said rib and said drive pin having an annular recess therebetween;
(h) a pair of sealing washers disposed between said retainer and said pin, one on each axial side of said annular rib;
(i) a counterbalance formed with a hub having a bore therethrough and a pair of counterbores, one on each end of said bore and communicating therewith;
(j) one of said counterbores being substantially alined with said bore, and the other of said counterbores being formed eccentrically of said bore;
(k) said drive pin being received in said eccentric counterbore and having a recess formed therein eccentrically to its axis; and
(l) a drive spindle journaled in said housing and having a portion received in said alined counterbore;
(m) said spindle having an integral extension of reduced diameter passing through said bore and eccentric counterbore and being received in said recess in said drive pin and secured therein, thereby securing said drive pin and spindle together, and thereby properly orienting and locating said counterbalance and retaining it between said pin and spindle.

10. In an abrading tool having a housing and an oscillating platen resiliently mounted to the housing, a driving mechanism for the platen, comprising, in combination:
(a) a drive spindle journaled in the housing;

(b) an eccentric drive pin secured to said spindle;
(c) a counterbalance having a hub portion retained between said spindle and said pin;
(d) a bearing retainer comprising an inverted cup-shaped member secured to the platen;
(e) a spherical seat formed in said retainer facing the platen;
(f) a spherical sleeve bearing in said seat to journal said pin; and
(g) a pair of axially-spaced sealing washers mounted on said retainer above said spherical bearing; said sealing washers being disposed radially between said retainer and said drive pin;
(h) whereby said bearing within said retainer is sealed from the dust-laden atmosphere externally of said retainer.

11. In an abrading tool having a housing and a work-engaging platen, a driving mechanism for the platen, comprising:
(a) a counterbalanced eccentric drive pin and means in the housing to drive said pin;
(b) a bearing retainer comprising an inverted substantially cup-shaped member secured on top of the platen;
(c) a porous lubricant-impregnated sleeve bearing within said retainer to journal said eccentric drive pin;
(d) an inwardly-projecting annular rib formed on said bearing retainer above said bearing; and
(e) a pair of sealing washers disposed between said retainer and said pin, one on each axial side of said annular rib;
(f) whereby said bearing in said retainer is sealed from the dust-laden atmosphere externally of said retainer.

12. A driving mechanism as defined in claim 11, wherein:
(a) said bearing comprises a spherical bearing keyed to said bearing retainer; and wherein:
(b) said drive pin and said annular rib of said retainer have an annular clearance recess therebetween, whereby the alinement of said drive pin and said spherical bearing is accommodated.

13. A driving mechanism for an abrading tool, comprising:
(a) a driving spindle member having an integral externally-threaded portion of reduced diameter;
(b) a driven eccentric member having an internally-threaded recess formed therein along an eccentric axis;
(c) a unitary counterbalance having an integral hub portion formed to provide a bore and a communicating counterbore, the axis of the counterbore being eccentric to the axis of said bore;
(d) said driven eccentric member being received within said counterbore and having its recess alined with the axis of said bore; and
(e) said threaded portion of said driving spindle member being received through said bore and being threaded into said recess of said driven eccentric member to secure the latter in endwise engagement in the counterbore.

14. A driving mechanism for an abrading tool, comprising:
(a) a unitary counterbalance having an integral portion formed to provide a bore and a communicating counterbore, the axis of the counterbore being eccentric to the axis of said bore;
(b) a driving member;
(c) a driven member;
(d) one of said members being received within said counterbore in endwise engagement therein and having its axis alined therewith; and
(e) means to secure said members together and to retain said counterbalance therebetween in properly oriented position with respect to said members; said means comprising:
  (1) an extension element formed on one of said members; and
  (2) a recess element formed on the other of said members;
  (3) one of said elements being formed on its respective member along an axis which is eccentric with respect to the axis of said member by an amount which is substantially equal to the eccentricity of said counterbore with respect to said bore;
  (4) said one element having its axis substantially alined with the axis of said bore, thereby circumferentially positioning its respective member with respect to said counterbore in said counterbalance; and
  (5) said one element being received through said bore and within the other of said elements and being secured therein.

References Cited by the Examiner

UNITED STATES PATENTS

| | | | |
|---|---|---|---|
| 1,085,867 | 2/14 | Kennedy | 74—86 |
| 2,193,713 | 3/40 | Cole | 308—134.1 |
| 2,606,947 | 8/52 | Happe | 172—36 |
| 2,683,336 | 7/54 | Scace | 51—170 |
| 2,722,789 | 11/55 | Robins | 51—170 |
| 2,792,162 | 5/57 | Cassé | 51—59 X |
| 2,830,411 | 4/58 | Hartmann | 51—170.3 |

LESTER M. SWINGLE, *Primary Examiner.*

J. SPENCER OVERHOLSER, *Examiner.*